(12) United States Patent
Gillman

(10) Patent No.: US 9,724,874 B2
(45) Date of Patent: Aug. 8, 2017

(54) METHOD FOR SPLICING STRESS SKINS USED FOR MANUFACTURING STRUCTURAL INSULATED PANELS

(71) Applicant: Jerry Gillman, Miami, FL (US)

(72) Inventor: Jerry Gillman, Miami, FL (US)

( * ) Notice: Subject to any disclaimer, the term of this patent is extended or adjusted under 35 U.S.C. 154(b) by 0 days.

(21) Appl. No.: 14/630,193

(22) Filed: Feb. 24, 2015

(65) Prior Publication Data

US 2015/0239221 A1 Aug. 27, 2015

Related U.S. Application Data

(60) Provisional application No. 61/943,578, filed on Feb. 24, 2014.

(51) Int. Cl.
*B29C 65/00* (2006.01)
*B32B 37/02* (2006.01)
*B32B 37/12* (2006.01)
*B32B 37/18* (2006.01)

(52) U.S. Cl.
CPC ............ *B29C 66/435* (2013.01); *B32B 37/02* (2013.01); *B32B 37/1292* (2013.01); *B32B 37/185* (2013.01); *B32B 2305/022* (2013.01); *B32B 2307/304* (2013.01); *B32B 2307/7265* (2013.01); *B32B 2325/00* (2013.01); *B32B 2607/00* (2013.01)

(58) Field of Classification Search
CPC ............... B29C 66/1142; B29C 66/435; Y10T 156/1089; Y10T 156/1092; Y10T 156/1093; B32B 37/185; B32B 2307/304; B32B 607/00; B32B 2607/00; E04C 2/292; B27D 1/10

USPC ...... 156/297, 299, 300, 304.1, 304.3, 304.4; 52/309.14, 309.15, 309.4, 794.1
See application file for complete search history.

(56) References Cited

U.S. PATENT DOCUMENTS

| | | | | |
|---|---|---|---|---|
| 1,997,996 A | * | 4/1935 | Carstens | B27D 1/00 144/332 |
| 3,511,737 A | * | 5/1970 | Oita et al. | B27D 1/04 108/57.34 |
| 4,499,821 A | * | 2/1985 | Clouston | B30B 15/16 100/195 |
| 6,824,851 B1 | * | 11/2004 | Locher | B29C 70/086 156/250 |
| 2004/0219355 A1 | * | 11/2004 | Clemmens | C09J 7/043 428/343 |

FOREIGN PATENT DOCUMENTS

GB 541945 A * 12/1941 ............... B27D 1/10

* cited by examiner

*Primary Examiner* — John Goff

(57) ABSTRACT

A method for manufacturing substantially longer structural insulated panels through lamination without sacrificing thermal efficiency and structural integrity. The method includes laminating an insulating structure in between a lower sheet of serial panels and an upper sheet of serial panels. The individual structural panels of the lower sheet of serial panels are spliced together with a plurality of lower splice plates. Similarly, the individual structural panels of the upper sheet of serial panels are spliced together with a plurality of upper splice plates. The plurality of upper splice plates is positioned offset from the plurality of lower splice plates. The resulting elongated structural insulated panel retains its characteristics due to the positioning of the splice plates and their integration into the manufacturing method.

6 Claims, 10 Drawing Sheets

METHOD FOR SPLICING STRESS SKINS USED FOR MANUFACTURING STRUCTURAL INSULATED PANELS

The current application claims a priority to the U.S. Provisional Patent application Ser. No. 61/943,578 filed on Feb. 24, 2014.

FIELD OF THE INVENTION

The present invention relates generally to methods for manufacturing structural insulated panels (SIPs). More specifically, the present invention provides is a process/technique for splicing multiple SIPs together without reducing the thermal efficiency and compromising the structural integrity.

BACKGROUND OF THE INVENTION

Structural insulated panels (SIPs) are load bearing sandwich panels that are manufactured using a high density foam core, most often expanded polystyrene (EPS), laminated with structural material on either side. When the SIP have been pressed and cured, the stressed skins form a load bearing building panel that handles structural loads similar to how an I-beam handles structural loading. The common skins used for SIPs include plywood, oriented strand board (OSB), magnesium oxide board, cement fiber, fiber-reinforced plastic and a host of other materials suitable for the intended use of the panel. As the structural integrity of the SIPs is based on a continuous stressed skin, lengths of SIPs have been limited by the available lengths of skin material. Plywood, for example, is manufactured and sold in maximum lengths of eight feet, thereby limiting the panel length of plywood based SIPs to eight feet. Similarly, cement fiber board is manufactured with maximum lengths of 12 feet, limiting the panel length of cement fiber based SIPs to 12 feet. OSB is manufactured in industrial lengths of 26 feet, affording the SIP industry a maximum SIP panel length.

As only OSB and metal skins are found in these extended lengths, OSB and metal skin based SIP panels have previously controlled the majority of the SIP Industry. To build a longer SIP, a multitude of skins may be integrated together through a process known as splicing. The common method for splicing skins together involves manufacturing SIPs with interior metal channels or incorporating material support located within the SIPs at the splice point of each skin. This method is less than desirable as it forms a structural hinge at the splice point as well as a thermal break in the SIP. The structural hinge creates a high stress region and the thermal break greatly reduces the thermal efficiency of the SIP both essential characteristics for industrial uses. The present invention resolves the thermal break as well as the structural hinge issue caused by the existing method of splicing continuous SIP panels.

DETAIL DESCRIPTIONS OF THE INVENTION

Figure 1:
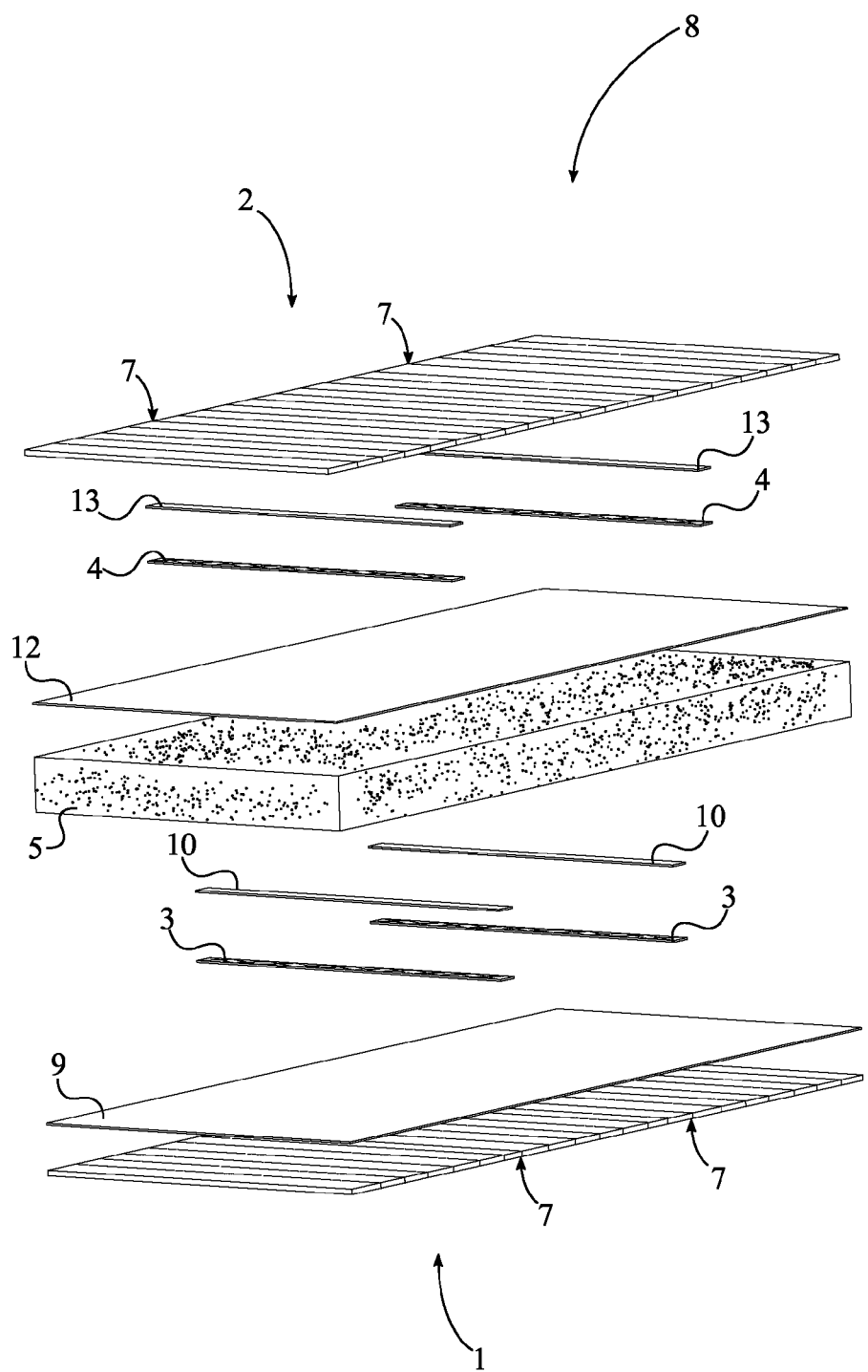
FIG. 1 is an exploded perspective view of the structural insulated panel.
Figure 2:
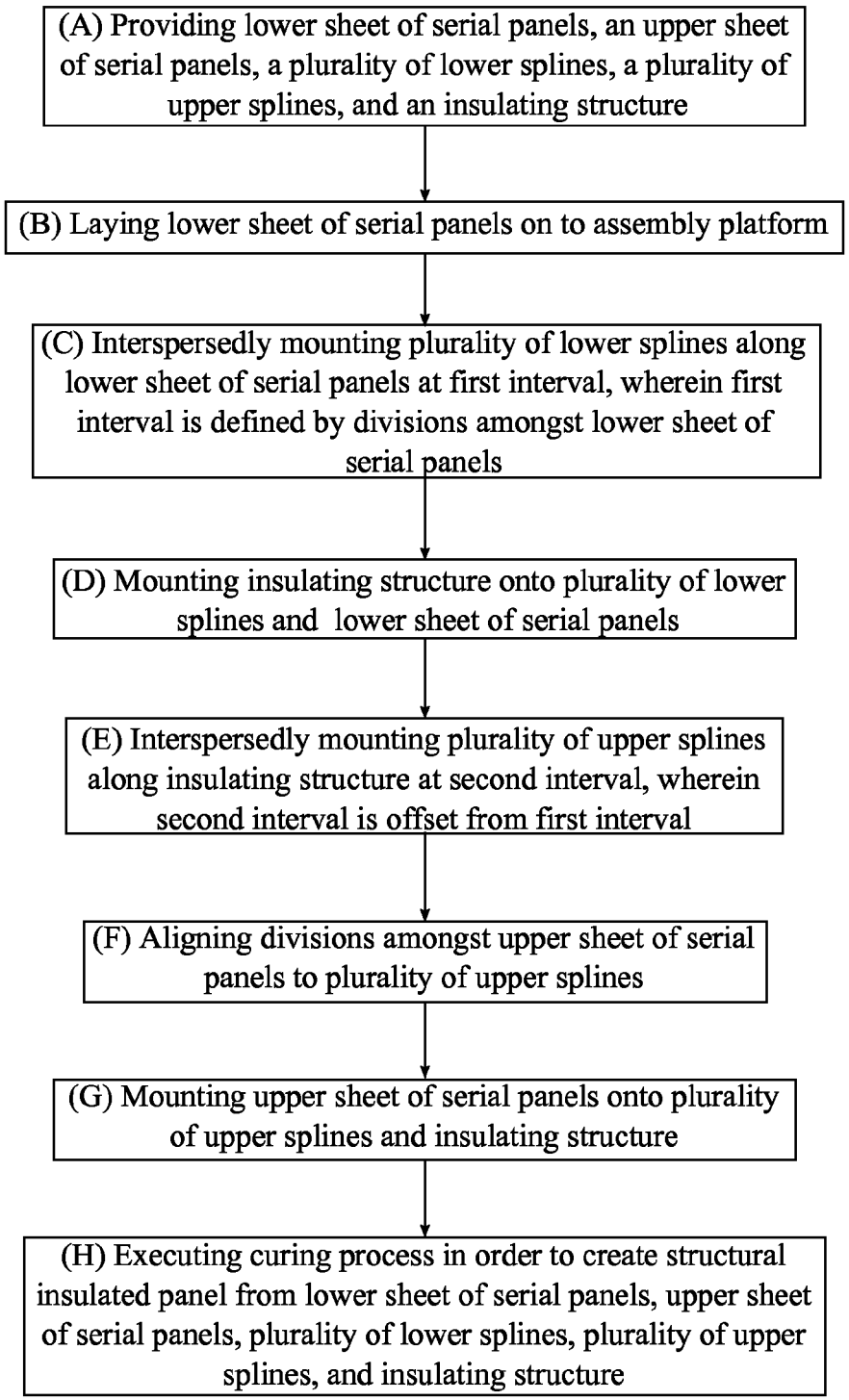
FIG. 2 is a flow chart depicting the overall process for the present invention.

All illustrations of the drawings are for the purpose of describing selected versions of the present invention and are not intended to limit the scope of the present invention.

The present invention is the manufacturing method for structural insulated panels 8 with splicing stress skins through lamination. More specifically, the present invention is the manufacturing process which produces substantially longer structural insulated panels 8 compared to traditional means without sacrificing thermal efficiency and structural integrity. Traditional structural insulated panels 8 comprise a rigid insulating core sandwiched in between two layers of structural panels. Structural insulated panels 8 are ideal building material for constructing apartments, houses, and other similar structures. Due to the structural insulated panel's 8 high thermal efficiency less energy and effort is required to maintain adequate internal temperatures for houses and storage spaces which in turn decrease operating costs.

The present invention is the method for manufacturing structural insulated panels 8 with the following components: a lower sheet of serial panels 1, an upper sheet of serial panels 2, a plurality of lower splice plates 3, a plurality of upper splice plates 4, and an insulating structure 5. Both the lower sheet of serial panels 1 and the upper sheet of serial panels 2 are a plurality of structural panels commonly used in the manufacturing field arranged end-to-end in succession, along the same plane. The plurality of structural panels may be composed of materials including, but not limited to, plywood, sheet metal, oriented strand board, magnesium oxide board, cement fiber, and fiber-reinforced plastic to name a few non-limiting examples. The length, width, and thickness of the lower sheet of serial panels 1 and the upper sheet of serial panels 2 may vary depending on the requirements of the project. It is preferred that the lower sheet of serial panels 1 and the upper sheet of serial panels 2 be of equal length and width; this may be achieved through the use of different sized individual structural panels. Additionally, the equal sizing may be produced through trimming and cutting of the individual structural panels prior to manufacturing. Standardized sizing of structural insulated panels 8 facilitate faster construction times with fewer workers.

The lower sheet of serial panels 1 and the upper sheet of serial panels 2 provide the structural support for the structural insulated panel 8. The lower sheet of serial panels 1 and the upper sheet of serial panels 2 bear the forces and pressures that a structural insulated panel 8 may experience during its lifetime. The plurality of upper splice plates 4 structurally connects each structural panels from the upper sheet of serial panels 2 together. Similarly, the plurality of lower splice plates 3 structurally connects each structural panels from the lower sheet of serial panels 1 together. The preferred composition for the plurality of the upper splice plates 4 and the plurality of lower splice plates 3 is carbon fiber-reinforced polymer. The resulting structural connection in between adjacent structural panels forms a thermal and water resistant barrier, ensuring high thermal efficiency and a waterproof surface. This manufacturing method is superior to traditional methods as they most often create thermal breaks at the splice point which in turn reduce the thermal efficiency of the structural insulated panel 8. The splice plates of the plurality of lower splice plates 3 and the plurality of upper splice plates 4 may incorporate multitude of holes, cuts, and receptive cavities to facilitate a strong bond. In alternative composition, the splice plates of the plurality of lower 3 and plurality of upper splice plates 4 may be composed of phenolic resin material or other similar materials. The insulating structure 5 acts a thermal barrier and prevents heat from passing through the structural insulated panel 8. The insulated structure 5 is preferably made from expanded polystyrene foam, however the insulated structure can also be made from a variety of other materials including, but not limited to, expanded polystyrene, extruded polystyrene foam, polyisocyanurate foam, composite honeycomb, and polyurethane foam.

Figure 3:
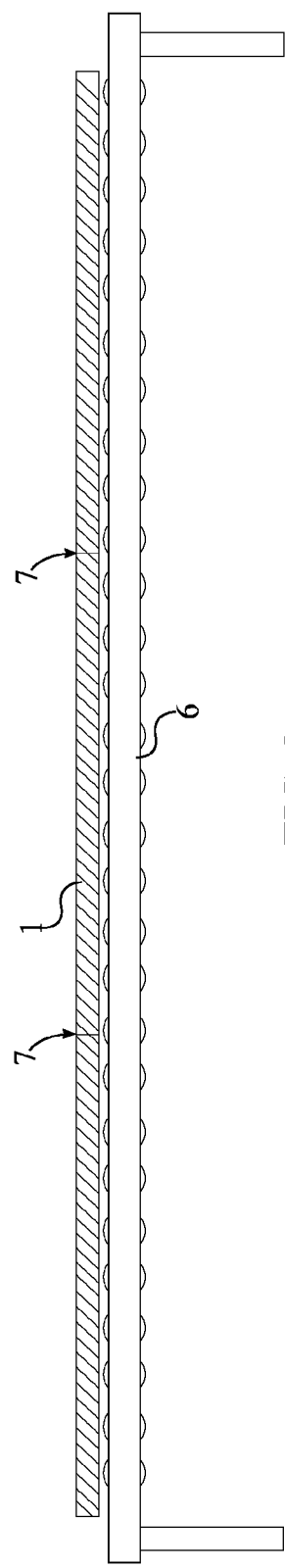
FIG. 3 is a side view depicting step (B) of the overall process.

The overall process of the present invention is summarized and depicted in FIG. 2 and FIGS. 3-10. The lower sheet of serial panels 1 is laid down onto an assembly platform 6 with the bottom surface engaging the assembly platform 6. The lower sheet of serial panels 1 acts as a base for building the structural insulated panel 8 during the manufacturing process. The next step is interspersedly mounting the plurality of lower splice plates 3 along the lower sheet of serial panels 1 at a first interval, wherein the first interval is defined by divisions 7 amongst the lower sheet of serial panels 1. More specifically the divisions 7 coincide with the junctions created in between adjacent structural panels of the lower sheet of serial panels 1 as seen in FIG. 3. The insulating structure 5 is then mounted onto the plurality of lower splice plates 3 and the lower sheet of serial panels 1, coincident with the lower sheet of serial panels 1.

Figure 8:
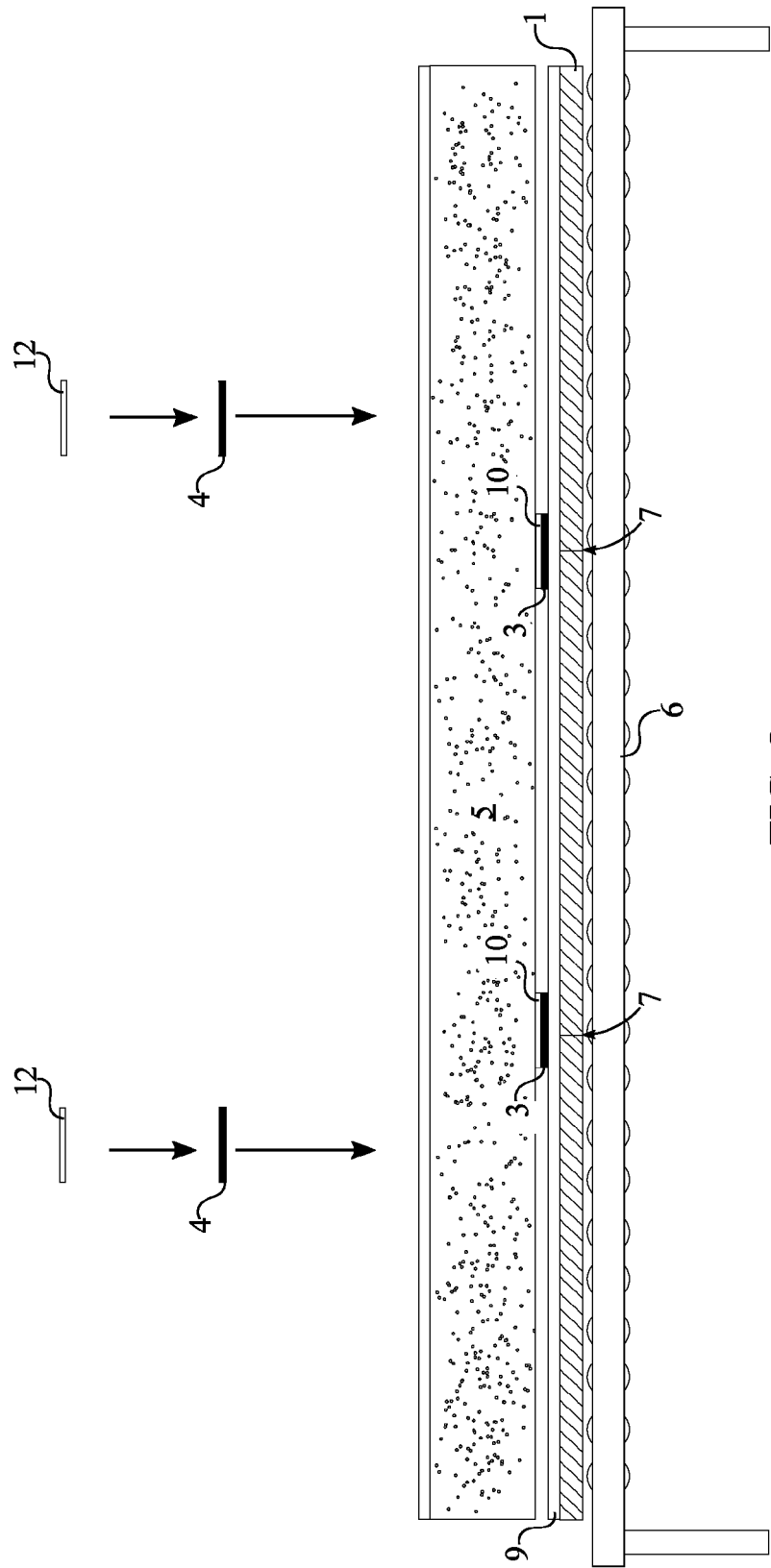
FIG. 8 is a side view depicting step (F) and (G) as well as the application of the fourth adhesive layer in between said steps of the overall process.
Figure 9:
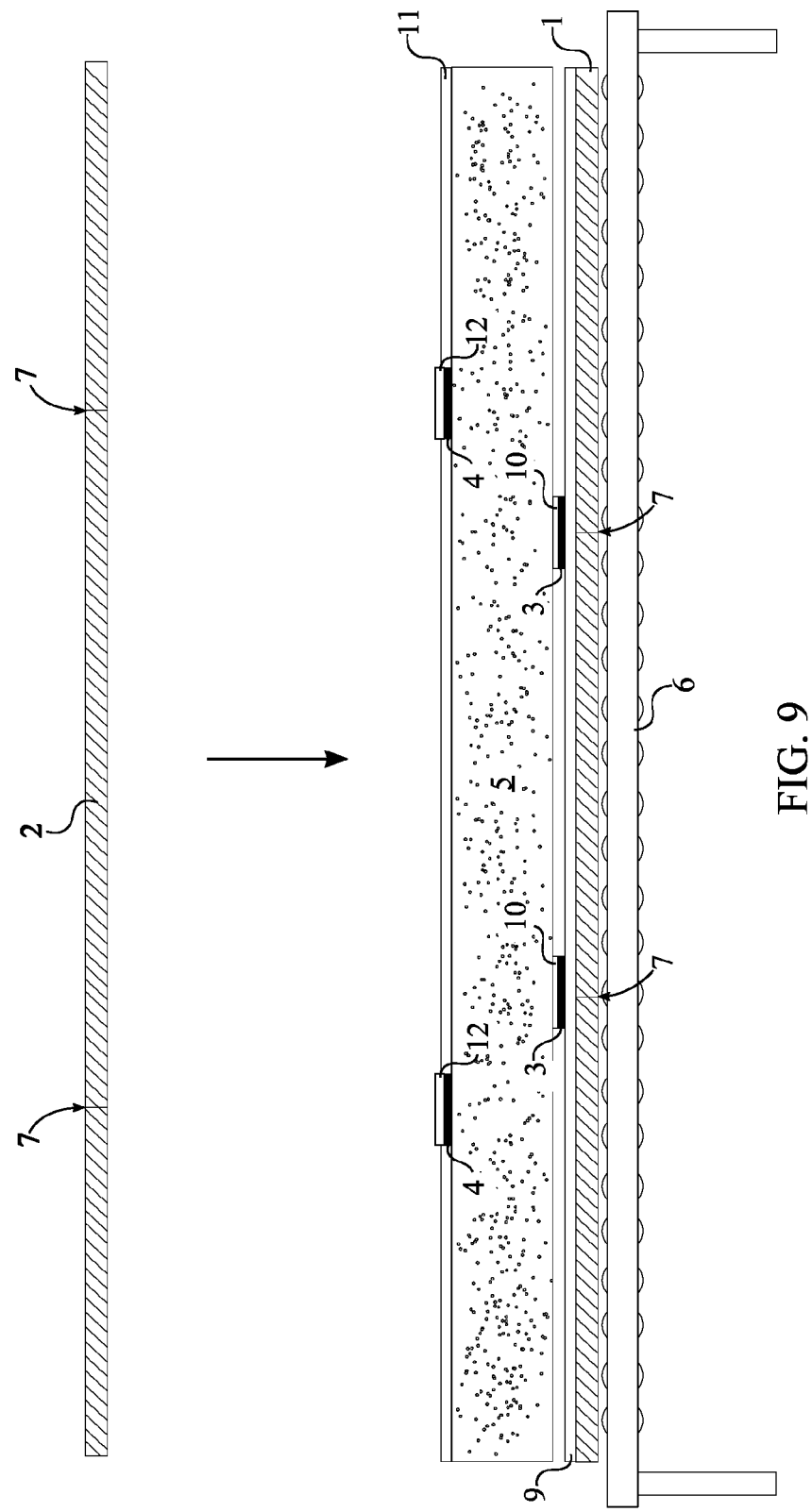
FIG. 9 is a side view depicting step (G) of the overall process.

Splice points in structural insulated panels 8 are inherently more susceptible to structural failure than the individual structural panels. It is therefore important to stagger the plurality of lower splice plates 3 in between the plurality of upper splice plates 4. Continuing the overall process, the plurality of upper splice plates 4 is interspersedly mounted along the insulating structure 5 at a second interval as seen in FIG. 8. The second interval is offset from the first interval a certain distance; this ensures that a corresponding slice plate of the plurality of lower splice plates 3 does not vertically align with a corresponding splice plate of the plurality of upper splice plates 4 as this configuration increases structural integrity and avoids structural hinges. Then the divisions 7 amongst the upper sheet of serial panels 2 are aligned to the plurality of upper splice plates 4; positioning the individual structural panels of the upper sheet of serial panels 2 interspersed among the plurality of upper splice plates 4 as seen in FIG. 9. Once aligned, the upper sheet of serial panels 2 is mounted onto the plurality of upper splice plates 4 and the insulating structure 5. Due to the use of plurality of lower splice plates 3 and the plurality of upper splice plates 4, either side of the structural insulated panel 8 may be utilized as the exterior surface of a building system, further increasing ease of use for the builders. The final step of the overall process is executing a curing process in order permanently connect the lower sheet of serial panels 1, the plurality of lower splice plates 3, the insulating structure 5, the plurality of upper splice plates 4, and the upper sheet of serial panels 2 together in order to create the structural insulating panel 8.

Figure 4:
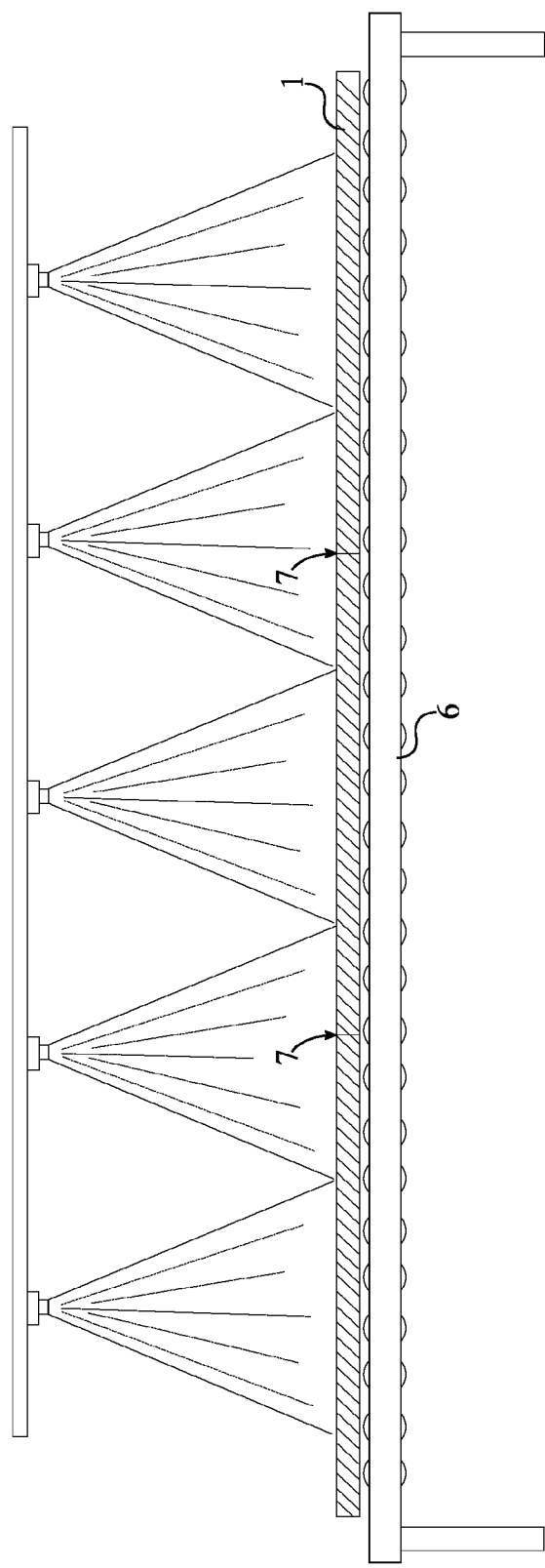
FIG. 4 is a side view depicting the application of the first adhesive layer in between steps (B) and (C) of the overall process.
Figure 5:
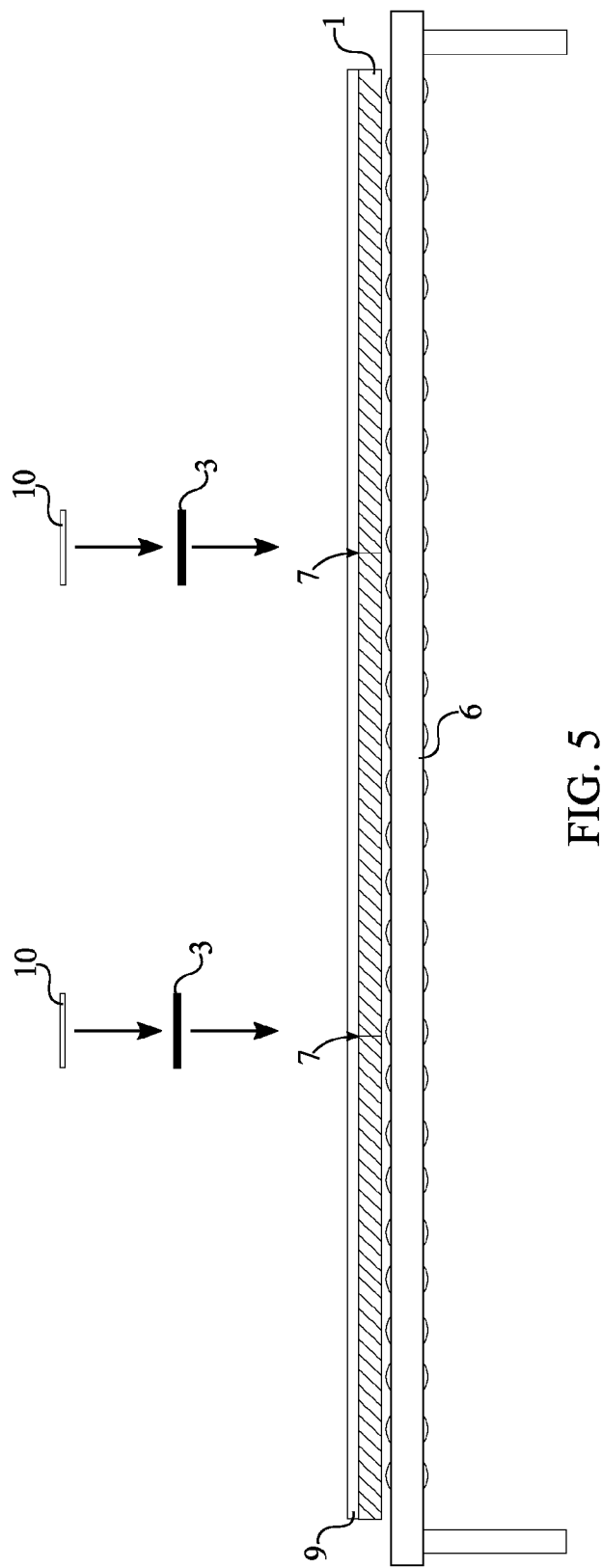
FIG. 5 is a side view depicting step (C) and the application of the second adhesive layer in between steps (C) and (D) of the overall process.
Figure 6:
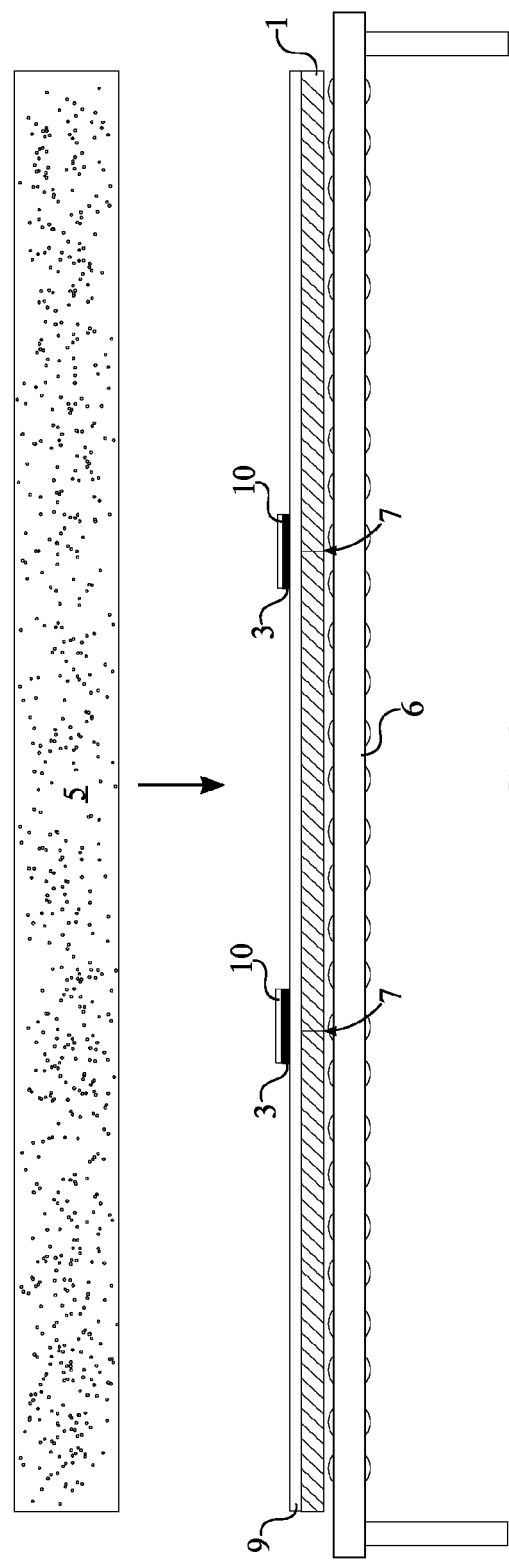
FIG. 6 is a side view depicting the step (D) of the overall process.
Figure 7:
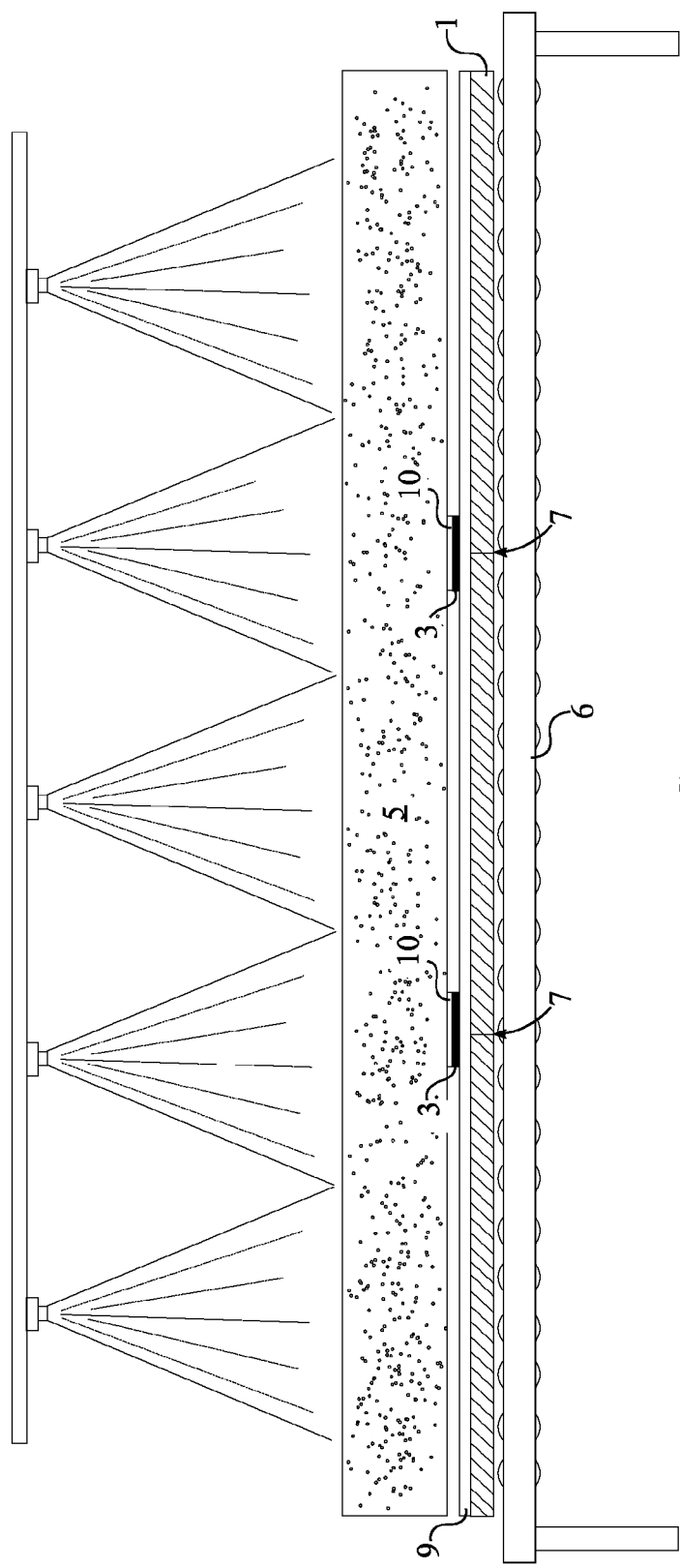
FIG. 7 is a side view depicting the application of the third adhesive layer in between steps (D) and (E) of the overall process.

Because the present invention is a kind of lamination process, adhesives need to be integrated between the constituent layers of the structural insulated panel 8. In the overall process of the present invention, adhesive is applied at four different steps to ensure maximum strength and stability of the structural insulted panel 8. It is preferred that an adhesive is sprayed in between each constituent layer of the structural insulated panel 8; alternative methods may only apply adhesive on partial layers. A first adhesive layer 9 is applied to the top surface of the lower sheet of serial panels 1 before the plurality of lower splice plates 3 is mounted to said surface as seen in FIG. 4. A second adhesive layer 10 is applied to the top surface of the plurality of lower splice plates 3 before the insulating structure 5 is mounted onto the plurality of lower splice plates 3 and the lower sheet of serial panels 1 as seen in FIG. 5. A third adhesive layer 11 is applied to the top surface of the insulating structure 5 after the insulating structure 5 is mounted as seen in FIG. 7. Lastly, a fourth adhesive layer 12 is applied to the top surface of the plurality of upper splice plates 4 before the upper sheet of serial panels 2 is mounted onto the plurality of upper splice plates 4 and the insulating structure 5 as seen in FIG. 8. Application of adhesive is preferably executed by an automatic spraying machine to ensure an even coat is applied at each separate step of the process while simultaneously increasing the time workers have to properly mount the next component(s).

Figure 10:
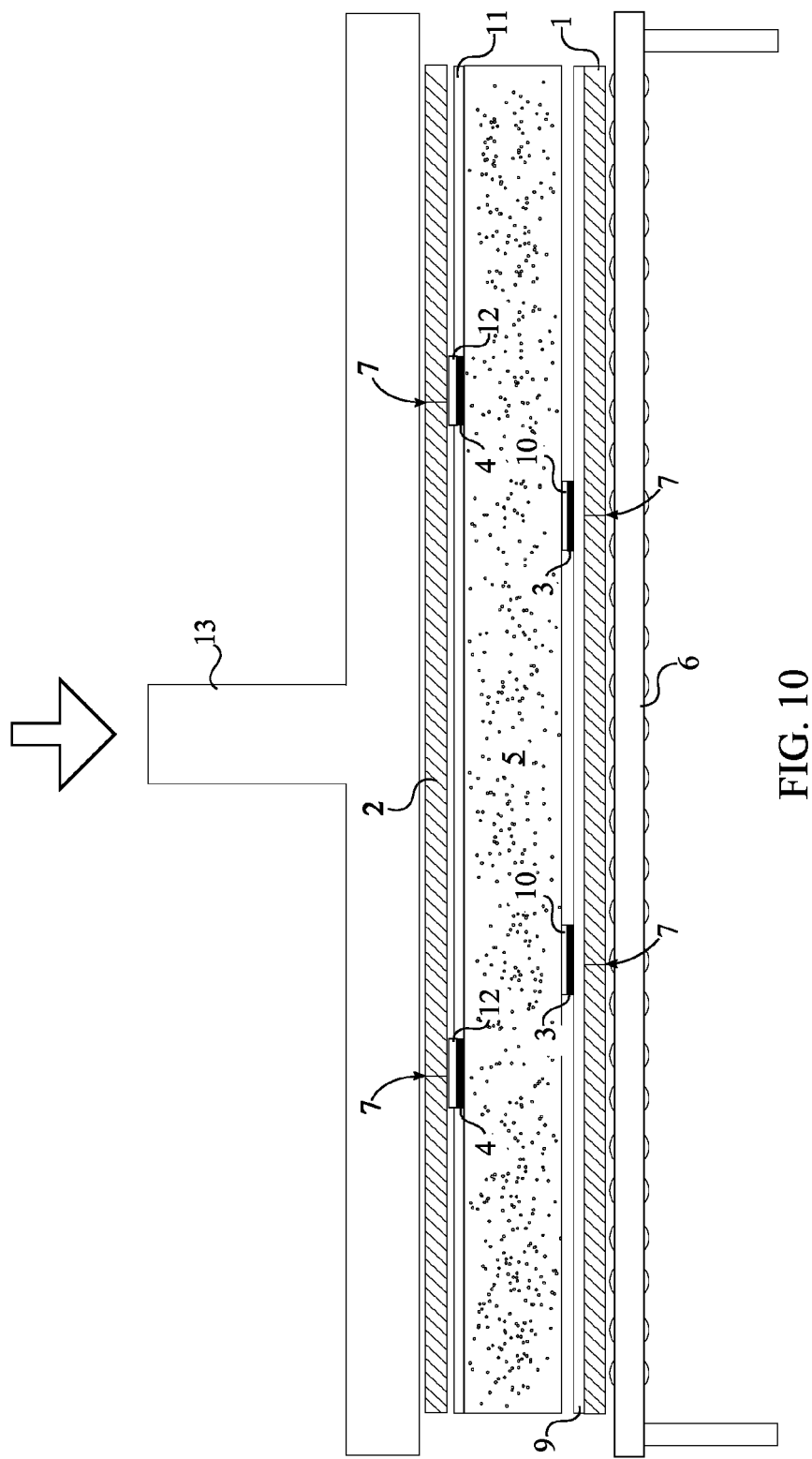
FIG. 10 is a side view depicting step (H) of the overall process.

The first adhesive layer 9, the second adhesive layer 10, the third adhesive layer 11, and the fourth adhesive layer 12 are set in and hardened through the curing process. The preferred curing process is exposing the constituent layers of the structural insulated panel 8 to uniform pressure for a required amount of time via a hydraulic press 13. The process includes inserting the lower sheet of serial panels 1, the upper sheet of serial panels 2, the plurality of lower splice plates 3, the plurality of upper splice plates 4, and the insulating structure 5 into the hydraulic press 13. Next the hydraulic press 13 is actuated for the required amount of time, thus applying uniform pressure to the top surface of the upper sheet of serial panels 2 as seen in FIG. 10. The required amount of time applied by the hydraulic press 13 may vary depending on the type of adhesive, size of the structural insulated panel 8, materials composition, and other defining characteristics. Alternative curing processes may be used instead or in addition to the aforementioned preferred process. Alternative curing processes may include the application of heat, pressure, ultraviolet light, the use of an additional bonding agent, or a combination thereof. In alternative methods, additional surface finishing processes may be implemented after the curing process to further strengthen the structural insulated panel 8; such processes may improve adhesion, resistance to molding and liquids, chemical resistance, and aesthetical appearances. In an another method of the present invention, mechanical fasteners such as nails and screws may be used to connect the constituents of the structural insulated panel 8; in which case a curing process would not be required.

Although the invention has been explained in relation to its preferred embodiment, it is to be understood that many other possible modifications and variations can be made without departing from the spirit and scope of the invention as hereinafter claimed.

What is claimed is:

1. A manufacturing method for splicing stress skins comprises the steps of:
   (A) providing a lower sheet of serial panels, an upper sheet of serial panels, a plurality of lower splice plates, a plurality of upper splice plates, and an insulating structure;
   (B) laying the lower sheet of serial panels onto an assembly platform;
   (C) interspersedly mounting the plurality of lower splice plates along the lower sheet of serial panels at a first interval, wherein the first interval is defined by divisions amongst the lower sheet of serial panels;
   (D) mounting the insulating structure onto the plurality of lower splice plates and the lower sheet of serial panels;
   (E) interspersedly mounting the plurality of upper splice plates along the insulating structure at a second interval, wherein the second interval is offset from the first interval;
   (F) aligning divisions amongst the upper sheet of serial panels to the plurality of upper splice plates;
   (G) mounting the upper sheet of serial panels onto the plurality of upper splice plates and the insulating structure; and
   (H) executing a curing process in order to create a structural insulated panel from the lower sheet of serial panels, the upper sheet of serial panels, the plurality of lower splice plates, the plurality of upper splice plates, and the insulating structure;
   wherein each of the plurality of upper splice plates and each of the plurality of lower splice plates is made of a carbon fiber-reinforced polymer; each of the plurality of upper splice plates and each of the plurality of lower splice plates is made of a phenolic resin material; the upper sheet of serial panels and the lower sheet of serial panels are of equal length and equal width; and the insulating structure is made of an expanded polystyrene foam.

2. The method for splicing stress skins as claimed in claim 1 further comprises the steps of:
   applying a first adhesive layer in between steps (B) and (C).

3. The method for splicing stress skins as claimed in claim 1 further comprises the steps of:
   applying a second adhesive layer in between steps (C) and (D).

4. The method for splicing stress skins as claimed in claim 1 further comprises the steps of:
   applying a third adhesive layer in between steps (D) and (E).

5. The method for splicing stress skins as claimed in claim 1 further comprises the steps of:
   applying a fourth adhesive layer in between steps (F) and (G).

6. The method for splicing stress skins as claimed in claim 1 further comprises the steps of:
   providing a hydraulic press for the curing process;
   inserting the lower sheet of serial panels, the upper sheet of serial panels, the plurality of lower splice plates, the plurality of upper splice plates, and the insulating structure into the hydraulic press; and
   applying uniform pressure across the upper sheet of serial panels for a required time by actuating the hydraulic press.

* * * * *